United States Patent [19]
Akemura

[11] Patent Number: 5,742,018
[45] Date of Patent: *Apr. 21, 1998

[54] DEVICE FOR AND METHOD OF SETTING MACHINING CONDITIONS FOR ELECTRICAL DISCHARGE MACHINING

[75] Inventor: Osamu Akemura, Yokohama, Japan

[73] Assignee: Sodick Co., Ltd., Japan

[*] Notice: The term of this patent shall not extend beyond the expiration date of Pat. No. 5,511,426.

[21] Appl. No.: 464,663

[22] PCT Filed: Oct. 21, 1994

[86] PCT No.: PCT/JP94/01777

§ 371 Date: Jun. 21, 1995

§ 102(e) Date: Jun. 21, 1995

[87] PCT Pub. No.: WO95/11105

PCT Pub. Date: Apr. 27, 1995

[30] Foreign Application Priority Data

Oct. 21, 1993 [JP] Japan ................................ 5-298867

[51] Int. Cl.$^6$ ........................................ B23H 1/02
[52] U.S. Cl. .......................... 219/69.13; 219/69.18
[58] Field of Search .................... 219/69.13, 69.18, 219/69.17; 364/474.04

[56] References Cited

U.S. PATENT DOCUMENTS

| | | | |
|---|---|---|---|
| 5,200,905 | 4/1993 | Uemoto et al. | 219/69.13 |
| 5,216,218 | 6/1993 | Sasaki | 219/69.13 |
| 5,267,141 | 11/1993 | Morita et al. | 219/69.13 |
| 5,408,064 | 4/1995 | Takahara | 219/69.18 |
| 5,428,201 | 6/1995 | Kaneko et al. | 219/69.13 |
| 5,571,426 | 11/1996 | Akemura | 219/69.13 |

FOREIGN PATENT DOCUMENTS

| | | | |
|---|---|---|---|
| 505570 | 9/1992 | European Pat. Off. | 219/69.17 |
| 4222779 | 1/1993 | Germany | 219/69.13 |
| 61-56829 | 3/1986 | Japan | 219/69.13 |
| 2-100822 | 4/1990 | Japan . | |
| 2-131838 | 5/1990 | Japan . | |
| 5-122524 | 4/1992 | Japan . | |
| 5-138444 | 6/1993 | Japan . | |
| 91/04821 | 4/1991 | WIPO | 219/69.13 |

*Primary Examiner*—Geoffrey S. Evans

[57] ABSTRACT

A machining condition setting apparatus for electrical discharge machining that sets the machining conditions, including the machining pulse energy, the feed of the electrode, etc. based on set data regarding specifications including the material of the workpiece and the desired surface roughness of the product. Plural sets of basic data showing the relationship between the machining conditions and the specifications resulting from the machining conditions are selected. The relationship between the specifications and machining conditions are stored in an inference unit which includes a neural network type computation unit, by using selected basic data. The inference unit determines the most appropriate machining conditions based on the set data and the specifications. Thus, the storage unit only need store a very small amount of basic data.

13 Claims, 9 Drawing Sheets

FIG. 5

Machining area of 50 mm²

| IP value | 25.0 | 20.0 | 15.0 | 10.0 | 5.0 | 3.0 | - - - - |
|---|---|---|---|---|---|---|---|
| Surface roughness | 145 | 120 | 80 | 50 | 27 | 15 | - - - - |
| Bottm gap | 450 | 400 | 350 | 250 | 170 | 65 | - - - - |
| Side gap | 380 | 320 | 270 | 210 | 140 | 55 | - - - - |
| Residue on bottom | 900 | 750 | 640 | 420 | 225 | 85 | - - - - |
| Residue on side face | 540 | 470 | 400 | 320 | 210 | 80 | - - - - |
| Depth (mm) | Reduction in electrode demension ||||||||
| 1 | 450 | 370 | 310 | 250 | 198 | 75 | - - - - |
| 5 | 500 | 430 | 380 | 300 | 220 | 110 | - - - - |
| 10 | 570 | 480 | 420 | 350 | 250 | 150 | - - - - |
| 20 | 660 | 590 | 510 | 420 | 295 | 170 | - - - - |
| 30 | 720 | 620 | 550 | 460 | 320 | 200 | - - - - |
| 50 | 800 | 720 | 610 | 490 | 360 | - - - - | - - - - |

Machining area of 100 mm²

| IP value | 25.0 | 20.0 | 15.0 | 10.0 | 5.0 | - - |
|---|---|---|---|---|---|---|
| Surface roughness | 150 | 130 | 75 | 45 | 25 | - - |
| Bottm gap | 450 | 400 | 310 | 230 | 160 | - - |
| Side gap | 380 | 320 | 250 | 190 | 120 | - - |
| Residue on bottom | 850 | 730 | 610 | 400 | 210 | - - |
| Residue on side face | 500 | 430 | 380 | 270 | 190 | - - |
| Depth (mm) | Reduction in electrode demension ||||||
| 1 | 450 | 370 | 300 | 240 | 190 | - - |
| 5 | 500 | 460 | 350 | 290 | 210 | - - |
| 10 | 550 | 500 | 400 | 330 | 240 | - - |
| 20 | 600 | 570 | 480 | 360 | 275 | - - |
| 30 | 660 | 600 | 530 | 400 | 310 | - - |
| 50 | 720 | 630 | 570 | 430 | 355 | - - |

FIG. 8

| Values to be obtained | Study data | | Inference data | |
| --- | --- | --- | --- | --- |
| | Input layer | Output layer | Input data | Inference data |
| 1st IP value | Machining area, Machning depth, Reduction in electrode demension | IP value | Actual machining area, Actual machning depth, Reduction in electrode demension | IP value $\alpha(1)$ |
| 2nd and subsequent IP values | Machining area, Surface roughness | IP value | Actual machining area, $\delta/2^n$ | IP value $\alpha(n+1)$ |
| Surface roughness | Machining area, IP value | Surface roughness | Actual machining area, IP value $\alpha(n)$ | Surface roughness $\delta(n)$ |
| Bottom gap | Machining area, IP value | Bottom gap | Actual machining area, IP value $\alpha(n)$ | Bottm gap |
| Side gap | Machining area, IP value | Side gap | Actual machining area, IP value $\alpha(n)$ | Side gap |
| Residue on bottom | Machining area, IP value | Residue on bottom | Actual machining area, IP value $\alpha(n)$ | Residue on bottom $\zeta(n)$ |
| Residue on side face | Machining area, IP value | Residue on side face | Actual machining area, IP value $\alpha(n)$ | Residue on side face $\epsilon(n)$ |
| Reduction in electrode demension | Machining area, IP value, Machining depth | Reduction in electrode demension | Actual machining area, IP value $\alpha(1)$, Actual machining depth | Reduction in electrode demension $\beta$ |

DEVICE FOR AND METHOD OF SETTING MACHINING CONDITIONS FOR ELECTRICAL DISCHARGE MACHINING

TECHNICAL FIELD

This invention relates to an electrical discharge machine ("EDM") that sets machining conditions, including the peak current, in accordance with data from specifications including the desired dimensions, surface roughness, and material of the product, and the dimensions and material of the electrode to be used, and to an electrical discharge machining method.

BACKGROUND OF THE INVENTION

Generally, in electrical discharge machining, the workpiece is electrical-discharge-machined by applying the voltage pulse to a clearance, called the gap, between the workpiece and the tool electrode (hereinafter the "electrode") while the electrode is fed in the vertical direction relative to the workpiece. A cavity having the desired dimensions and surface roughness is formed in the workpiece by means of the voltage pulse applied to the machining gap based on machining condition parameters including a certain OFF time of the voltage pulse applied to the gap and a certain ON time of the current pulse flowing through the gap, and the peak current. As machining progresses, machining conditions are progressively changed from those having a relatively large energy to those having a smaller energy.

The operator, when preparing for electrical discharge machining, first determines the workpiece material, and the dimensions and material of one or more electrodes to be used in accordance with the desired dimensions and the desired surface roughness of the cavity to be formed to the workpiece. A plurality of sets of machining conditions, including the current ON time, the peak current, and the OFF time of the voltage pulse applied to the gap are determined, and a machining program is compiled. The machining conditions include the feed of the electrode relative to the workpiece. Further, in applications where the workpiece is machined using a single electrode, the electrode may move relative to the workpiece in a plane perpendicular to the direction in which the electrode is vertically fed. The machining conditions may include the amplitude of this movement of the electrode.

Determining these machining conditions require a high degree of skill. To this end, an automatic programming device is proposed that compiles a machining program by automatically determining a plurality of sets of machining conditions in accordance with setting data from specifications including the desired workpiece or cavity dimensions, the desired surface roughness, the workpiece material, and the dimensions and material of the electrode to be used.

Such an automatic programming device stores a data table which includes the relationship between the plurality of sets of the machining conditions and machining results including the surface roughness obtained by the use of those machining conditions. From these plural sets of machining conditions, the set which will yield machining results which are approximate to the specifications are selected. If machining conditions corresponding to all possible specifications are stored in the storage device, the amount of stored data will be unduly large. Further, collecting such data would require an impractically large amount of time and man-hours.

In addition, a method of calculating machining conditions which are identical with or approximate to the specifications has been considered using a functional equation derived by expressing the relationship between the specifications, including such factors as the desired surface roughness, machining area, and machining depth; and machining conditions including the peak current. However, the relationship between the machining conditions, the surface roughness and the dimensional accuracy of the product produced by electrical discharge machining under those machining conditions is complicated.

This invention provides an electrical discharge machine that determines the machining conditions most suited to the machining specifications including the desired surface roughness, and a method of electrical discharge machining using such a machine.

DISCLOSURE OF THE INVENTION

To attain the above-mentioned purposes, the present invention provides a device for setting machining conditions for electrical discharge machining that sets the machining conditions, including the peak current and the feed of the electrode, based on input specifications including the desired surface roughness. The device may comprise:

an input unit to which data related to input specifications, including the material of the work-piece and the surface roughness of the product, is input, a basic data storage unit that stores a plurality of sets of basic data including the relationship between the input specifications and the machining conditions resulting from those input specifications, a data reader that reads out peripheral data most suited to the input specification data from the plurality of sets of basic data, an inference unit that studies the peripheral data and infers the machining conditions most suited to the input specification data, and an inference control unit that controls the study and inference functions of the inference unit.

In another aspect of the present invention, a method of setting machining conditions for electrical discharge is provided that sets the machining conditions, including peak current and the feed of the electrode, based on input specifications including the desired surface roughness. The method comprises:

setting data related to certain specifications, including the material of the workpiece and the desired surface roughness of the product, storing a plurality of sets of basic data indicative of the relationship between the specifications and the machining conditions, selecting plural sets of peripheral data having specifications most suited to the set specifications from the plurality of sets of basic data, studying the relationship between the specifications and the machining conditions using the plural sets of peripheral data, and inferring and compiling data for determining machining conditions suited to said input specifications and the relative movement of the electrode and the workpiece based on said study.

The method of setting machining conditions according to the present may further comprise:

adding the inferred and compiled data to the basic data, and using the basic data, including the added inferred and compiled data, when performing a subsequent step of inferring.

The machining conditions setting method according to the invention may further comprise:

storing, in advance, machining data related to the machining results obtained at the time of machining using certain electrical discharge machining conditions and the machining conditions, assembling the machining conditions stored in said machining data and the machining conditions not stored in said machining data when machining data regarding machining results is required, or assembling from the stored machining data one of the plural sets of peripheral data which is either close to or related to the required data from said stored machining conditions or from the machining data, studying said assembled peripheral data in a neural network, and inferring and compiling intermediate data related to the machining results obtained at the time of machining using the machining conditions suited to the required data after the step of studying said machining conditions.

Further, the method of electrical discharge machining according to the present invention may comprise electrical discharge machining by setting the machining conditions based on the data inferred and compiled by said electrical discharge machining data setting method.

BRIEF DESCRIPTION OF THE DRAWINGS

FIG. 5 is an example of a data table stored in the basic data storage unit of FIG. 1.

FIG. 8 is a diagram explaining the relationship between the study data and inferred values in neural network.

DESCRIPTION OF THE PREFERRED EMBODIMENT

Figure 1:
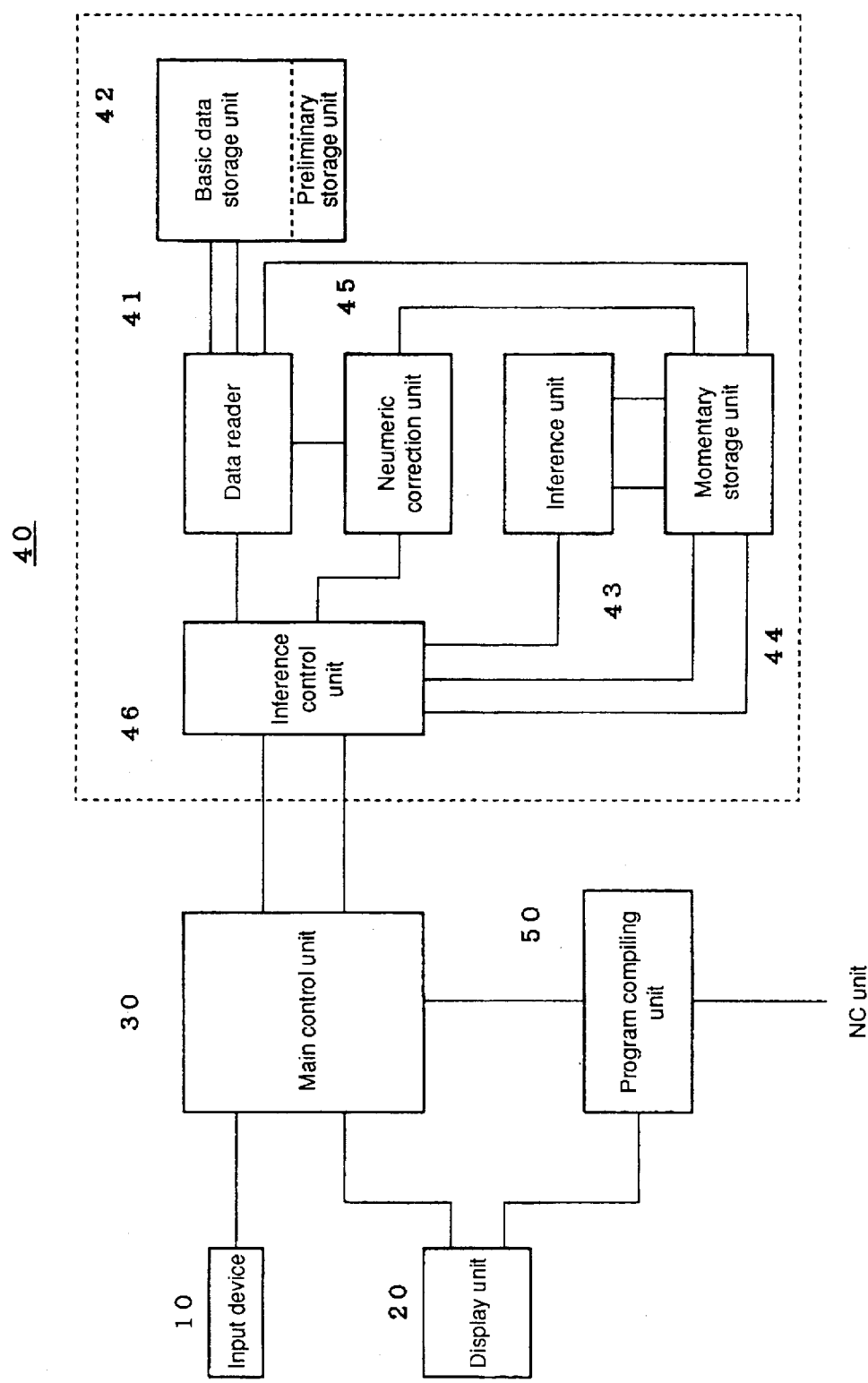
FIG. 1 is a block diagram illustrating an embodiment of a machining data determining the device according to the present invention.
Figure 2:
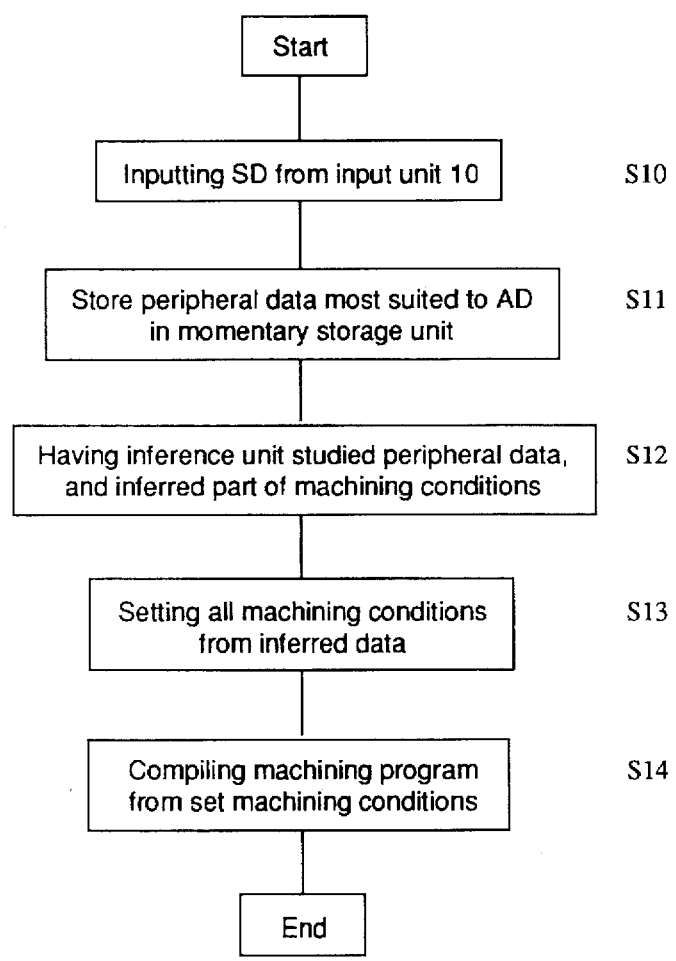
FIG. 2 is a main flow chart showing the operation of the device of FIG. 1.
Figure 3:
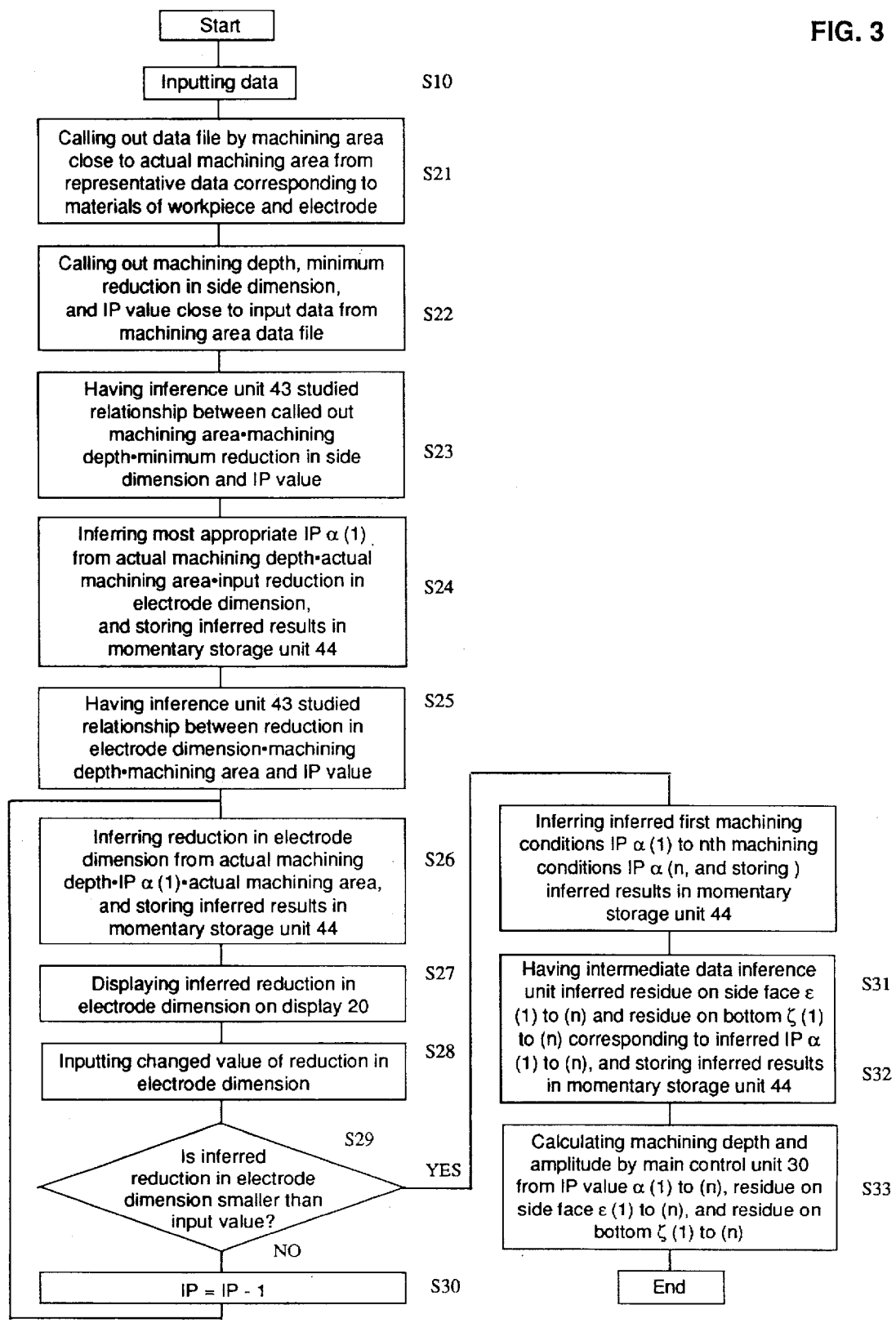
FIG. 3 is a flow chart showing the set data compiling operation.

This invention will now be described with reference to the drawings. FIG. 1 illustrates an embodiment of the drawing structure if a machining data determining device according the present invention. FIG. 2 is an operational drawing showing the operation of the structure of FIG. 1. FIG. 3 is an operational flow chart showing the operation of the setting data compiling section 40; and FIG. 5 is an example of a basic data table stored in the basic data storage unit 42.

In FIG. 1, reference numeral 10 is an input unit which may, for example, comprise a keyboard or the like; reference numeral 20 is a display unit such as a CRT; reference numeral 30 denotes a main control unit, preferably in the form of a CPU containing process software required to set the machining setting data. Reference number 50 denotes a compiling unit which compiles a machining program based on the received machining condition setting data from said main control unit 30 needed in order to compile a machining program, and outputs the machining program to the electrical discharge control unit, an NC unit or to a storage media. Reference number 40 denotes a setting data compiler that comprises a principal unit of this invention; it includes a data reader 41, a basic data storage unit 42, an inference unit 43, a momentary storage unit 44, a numeric correction unit 45, and an inference control unit 46.

Information from the input unit 10 comprises specification data (SD) including for example, the machining area, the material of workpiece, the material of electrode, the configuration of electrode, the taper angle of electrode, the reduction in electrode dimension, the machining depth, and the desired surface roughness.

The main control unit 30 commands the display 20 so as to display a screen suitable for inputting the specification data (SD). The operator inputs the specification data (SD) using the input device 10 such as a keyboard, while referencing the display 20. In the illustrated embodiment, the main control unit 30 outputs information such as the material(s) of the electrode(s) and the workpiece, the machining area, the machining depth of the cavity to be formed in the workpiece, the dimensional difference between the size of the cavity and that of the electrode to be used, called "the reduction in electrode dimension", the taper angle of the electrode and the data related to the desired surface roughness from the input specification data (SD). In addition, the main control unit 30 calculates the machining conditions to be used at each machining stage from rough machining to finish machining based on the data inferred and compiling by the setting data compiler 40, displays the calculated results on the display 20, and outputs the results to the machining program compiler 50. The main control unit 30 has the above-mentioned functions and may, for instance, comprise software for executing the desired process and a CPU.

The setting data compiler 40 includes a basic data storage unit 42 that stores a plurality of sets of basic data, which indicates the relationship between at least part of the specification data and the machining conditions. Further, as will be further explained below in the connection with FIG. 6, the setting data compiler 40 contains a neural network type computer that selects those sets of data which are most suitable to the specification data (SD) from among the basic data in the basic data storage unit 42, based on the specification data (SD) provided by the main control unit 30, and studies the relationship between the specification data and the machining conditions using the selected sets of data.

The setting data compiler 40 selects, based on the specification data (SD) provided by the main control unit 30, the data sets which are close to the input data or approximate to the specification data, from the basic data storage unit 42, and by means of a data reader 41, to the inference unit 43. The basic data storage unit 42 comprises a basic data storage unit that stores the plurality of sets of basic data for determining the most appropriate machining setting data (discussed below) and a preliminary storage unit for retaining the data obtained as a result of a inference for use during a subsequent inference. The inference unit 43 studies the peripheral data selected from the basic data storage unit 42 by the data reader 41 and further infers the data for calculating the machining conditions most suited to the specification data (SD). The momentary storage unit 44 momentarily stores the peripheral data and the inferred data necessary for the study by the inference unit 43. Where a tapered electrode is used, a numeric correction unit 45 that corrects the basic data which is affected by the inclination and provides the correction to the inference unit 43 is used. The inference control unit 46 controls the overall setting data compiler 40.

Next, a further description will be given with reference to FIG. 2 while explaining the operation of the apparatus of FIG. 1. FIG. 2 is a process flow chart showing the operation of the embodiment of the invention illustrated in FIG. 1.

First, the operator inputs the specification data (SD) using the input unit 10. The specification data necessary for determining the machining conditions most suitable for the machining to be performed is transferred to the setting data compiler 40 by the main control unit 30. In the setting data compiler 40, the inference control unit 46 commands the data reader 41 to assemble peripheral data close to or related to the specification data (SD) from the basic data storage unit 42. The peripheral data chosen is based on information sent from the inference control unit 46. The retrieved data is stored momentarily in the storage unit 44 (step S11). Using a neural network type computation, the inference unit 43 studies the peripheral data stored in the momentary storage unit 44, and infers the machining conditions appropriate for the specification data (SD). In this embodiment, the conditions include the peak current the amount of material to be left behind on the cavity on the side face(s) of the cavity (side face residue) necessary for finish machining in applications where the peak current is high, and the reduction in electrode dimension which has to be reserved in order to finish-machine from rough machining to the desired surface roughness, as well as conditions such as the feed of the electrode relative to the workpiece (step S12). Next, the main control unit 30 calculates the machining conditions (SP) for each machining stage based on the data (FD) inferred at the setting data compiler 40 (step S13). The program compiler 50 then writes, based on the machining conditions (SP) at each machining stage obtained at step S13, data of a predetermined location of the stored machining program to thereby complete the machining program (step S14).

Next, the operation of the setting data compiler 40 will be described with reference to FIG. 3.

The process here is that the machining conditions suited to the specification data (SD) input by the operator and the data that determines the relative movement between the electrode and the workpiece are inferred and compiled. As mentioned earlier, in conventional apparatus, the stored basic data are not in the form of analog values but comprise a plurality of pieces of normally used basic data stored in a non-continuous form. Therefore, when the input specifications do not agree with the basic data, machining conditions are determined with a reduction in electrode dimension and machining area taken into consideration. With the present invention, machining conditions are not maintained as basic data or as an amount related to the relative movement necessary for finish machining; in other words, with the present invention data such as the numerical data necessary for calculating the peak current, the reduction in electrode dimension, the vibration amplitude of electrode, and the feed of electrode are inferred and compiled.

The specification data (SD) are transferred to the inference control unit 46 from the main control unit 30. The inference control unit 46 directs the data reader 41 to assemble the peripheral data close to or related to the machining specification data (SD) input from the basic data storage unit 42 based on the specification data (SD) provided to the data reader 41.

Figure 4:
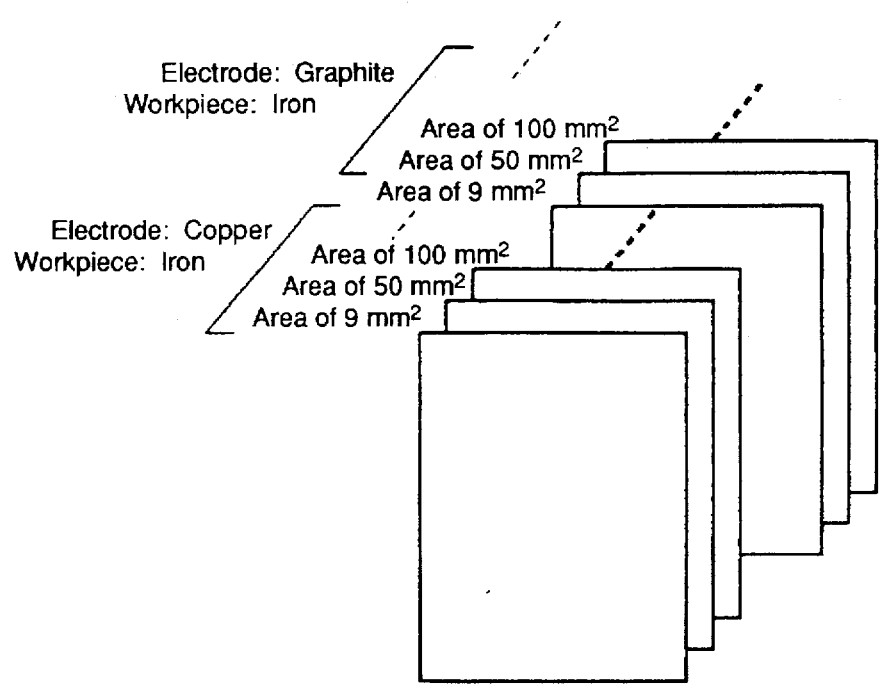
FIG. 4 is an example of a data file stored in the basic data storage unit of FIG. 1.

In the basic data stored in the storage unit 42, basic data is divided into representative data groups by electrode materials and workpiece materials as shown in FIG. 4, and further as data filed by machining area.

FIG. 5, includes a data file for a machining area of 50 mm² (the "first" data file) and second data file for a machining area of 100 mm² (the "second" data file). In the first data file, the "IP value" is the set value of the peak current corresponds to a setting representing a peak current of about 1.5 A per 1 IP. The "surface roughness" value is a surface roughness (μRmax) obtained when machining is done using the corresponding IP value, the "bottom gap" value is the over-cut in the direction of the bottom (μm) of the cavity, the "side gap" value is an over-cut (μm) in the direction of the side face of the cavity, the "residue on bottom" value is a finishing distance (μm) necessary for finish-machining to a surface roughnesses of 0.4 μRmax after machining was started with the corresponding IP value, and the "residue on side face" value is a finishing distance (μm) necessary in the direction of the side face after machining was started with the corresponding IP value. The "depth" column of the table shows the most appropriate relationship between the machining depth and reduction in electrode dimension for the corresponding IP values.

The setting data compiler 40 will now be further described, assuming that the specifications data (SD) is set as follows: The material of the workpiece is steel, and that of the electrode is copper. The machining area is 80 mm², the machining depth is 15 mm, and the reduction in electrode dimension is 360 μm. The taper angle of the electrode is 0 degrees, and the desired surface roughness is 0.4 μRmax. First, the two data files which are most suited to a machining area of 80 mm², in other words the data file for a machining area of 50 mm² and the data file for a machining area of 100 mm² (FIG. 5) are selected from a group of data files that satisfy the requirements that the electrode be copper and the workpiece be steel (at step S21 in FIG. 3).

Next, from the selected data file for a machining area of 50 mm², machining depths of 10 mm and 20 mm, which are closest to the actual machining depth (15 mm), are called out. Then peripheral data such as the reduction in electrode dimension which is most suited to an input reduction in electrode dimension of 360 μm is located, and the IP value corresponding to that reduction in electrode dimension is called out. Next, the same peripheral data is called out from the machining area of 100 mm² data set, which is the other data set closest to the actual machining area, in the same manner as described above (see step S22 in FIG. 3).

The inference control unit 46 commands the inference unit 43 to study the relationship between each element of peripheral data, based on the peripheral data groups D1 to D8 thus selected. This results in the following peripheral data groups.

| | Input Layer | | | |
|---|---|---|---|---|
| Study Data | Machining Area | Machining Depth | Reduction in Electrode Dimension | Output Layer IP Value |
| D1 | ( 50 | 10 | 350 ) | (10) |
| D2 | ( 50 | 10 | 420 ) | (15) |
| D3 | ( 50 | 20 | 295 ) | ( 5) |
| D4 | ( 50 | 20 | 420 ) | (10) |

-continued

| | | Input Layer | | |
|---|---|---|---|---|
| Study Data | Machining Area | Machining Depth | Reduction in Electrode Dimension | Output Layer IP Value |
| D5 | ( 100 | 10 | 330 ) | (10) |
| D6 | ( 100 | 10 | 400 ) | (15) |
| D7 | ( 100 | 20 | 275 ) | ( 5) |
| D8 | ( 100 | 20 | 360 ) | (15) |

Here, data elements which are a little larger or smaller than the input value have been called out as closest peripheral data. However, it is within the scope of the present invention for two neighboring values which are larger than and two neighboring values which are smaller than the input value, in the above example a total of 16 values, to be called out as the peripheral data or more than 16 values to be called out as the peripheral data.

Figure 6:
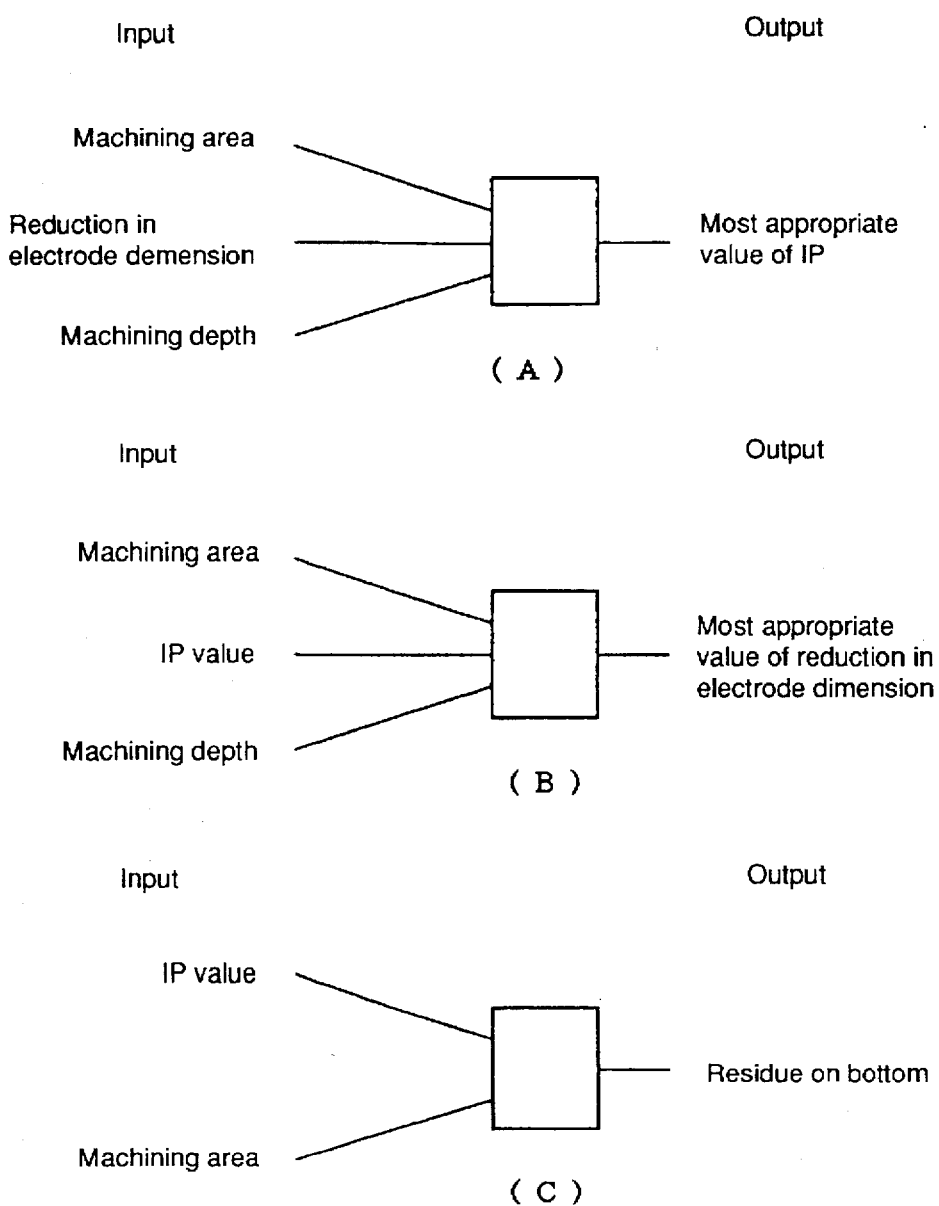
FIG. 6 is a model of an exemplary neural network of the inference unit of FIG. 1.

The inference unit 43, using the neural network model shown in FIG. 6, studies the peripheral data groups, D1 to D8 selected from the basic data storage unit 42. The machining area, machining depth, and reduction in electrode dimension in the above-mentioned data groups D1 to D8 are applied to the input side of the neural network model, and the IP value is applied to the output side. In this case, the study will be done eight times. After the study has been completed, the most suitable IP value will be inferred. Inference will be done using the actually input machining area (80 mm$^2$), machining depth (15 mm), and reduction in electrode dimension (360 μm) as input signals to obtain the most suitable IP α value. The IP value thus obtained is registered and stored in the momentary storage unit 44 as the peak current IP α(1) of the first study. In a similar manner, intermediate data suitable for the other machining requirements are obtained from the representative basic data stored as non-continuous point data (see steps S23 and S24 in FIG. 3.).

Next, the same study and inference as in steps S23 and S24 are done, because the data relating to the reduction in electrode dimension which corresponds to the obtained IP α(1) and estimated machining depth do not exist in the basic data. Therefore, the next step is to find the reduction in electrode dimension when machining is done with the obtained IP α(1). During the inferring operation step S25 of FIG. 3, the values studied in the inference unit 43 during the above-mentioned step S23 of FIG. 3 are deleted and a new study is done. As the input layer data at the time of study, the machining area, machining depth, and IP value in the peripheral data groups from D1 to D8 called out at the previous step are used and the output layer data is the reduction in electrode dimension. During the step of inferring, the machining area, machining depth, and IP α(1) actually input are taken as input data to obtain the inferred value β of the reduction in electrode dimension required when the machining commences using IP α(1) from the output layer (see steps S25 and S26 in FIG. 3).

The inferred value β of the reduction in electrode dimension thus obtained is displayed on the display 20 through the main control unit 30. The operator will input the displayed inferred value β if any change in electrode dimension is possible while referring to the displayed reduction in electrode dimension. If any change in electrode dimension is impossible, the reduction in electrode dimension input first as the machining preconditioned specification data (PD) is taken as the data. Subsequent process will be done based on this input data (see steps S26, S27, and S28 in FIG. 3).

In step S29 of FIG. 3, the inference control unit 46 compares the input value and the inferred value β, and when the former is larger than the latter, the inference control unit 46 again compares the input value and inferred value using the inferred IP α(1) reduced by 1. When the input value is equal to or larger than inferred value β, the operation proceeds to the steps after step S31 in FIG. 3. The step after step S31 in FIG. 3 comprises the process of obtaining the plural peak current values (IP values) to be used starting from the IP α(1) which is the first peak current, the IP value for finish machining to the final surface roughness, and the residue on side face ε, and residue on bottom ζ for each peak current, and infers and compiles the above-mentioned data by repeatedly performing the steps of studying and inferring (see steps S31 and S32 in FIG. 3).

Figure 9:
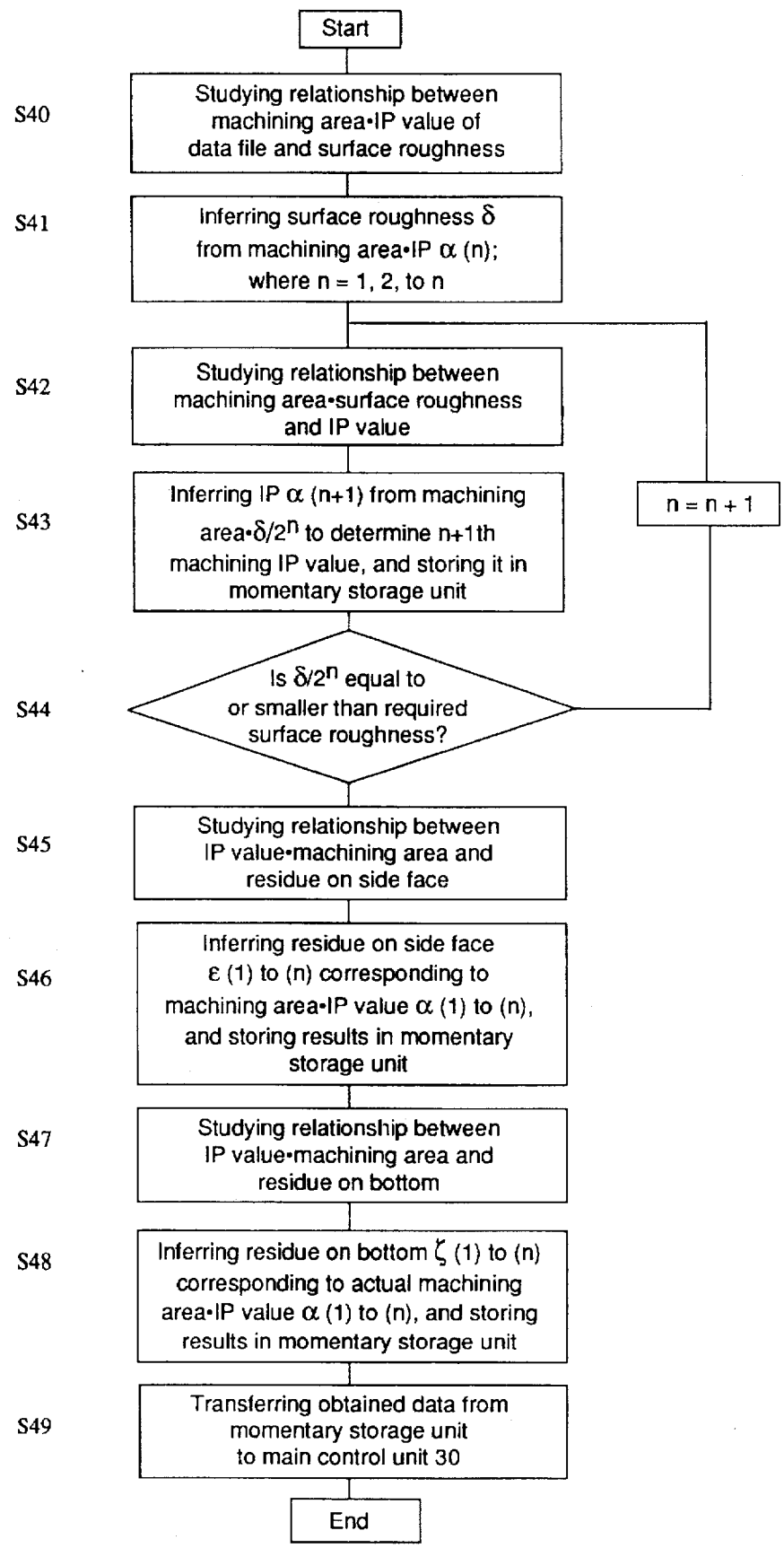
FIG. 9 is a flow chart illustrating the steps of studying, inferring, and determining the settings during plural machining stages.

FIG. 9 is a flow chart showing the details of steps S31 and S32 of FIG. 3. In accordance with step S30 at FIG. 3, the reduction in electrode dimension β and the first peak current IP α(1) have already been obtained, and therefore the process here is a process of studying and inferring the peak currents IP α(1) to (n) used during each of plural machining stages until the desired surface roughness is attained, and obtaining the residues on side face ε(1) to (n) and residues on bottom z(1) to (n) when machining is done with each peak current value.

The IP α(1) value obtained in the previous process value determined as the first peak current. The second peak current, i.e., the peak current to be used next, is concerned with obtaining a surface roughness approximately half of that obtained when machining with IP α(1). Such a value of peak current may be empirically understood to have a better machining efficiency. Therefore the inference unit 43 next infers an IP value which will produce a surface roughness about half of that which would be obtained using the valve IP α(1). First, similarly to the previous inferring method, the inference control unit 46 has the data reader 41 call out the machining area, IP value, and the surface roughness value corresponding to the IP value from the basic data storage unit 42. The inference control unit 46 then has the inference unit 43 study the surface roughness and the peripheral data related to the IP value, (see step S40 in FIG. 9). The study is done by using the surface roughness corresponding to the IP value as the output layer and using the machining area and the corresponding IP value as the input layer. Next, the surface roughness δ is inferred from the actual machining area and IP value α (n) (n=1). The steps of studying and inferring here preferably use a neural network such as that shown in FIG. 6 study and create inferences using the above-mentioned input data.

After studying the relationship between the machining area, the surface roughness corresponding to each IP value, and the IP value (see step S42 in FIG. 9), the inference control unit 46 causes the inference unit 43 to infer an IP value α(2) which will yield about half of the surface roughness obtained with the first IP value using data corresponding to the actual machining area and a surface roughness of d/2$^n$. The inferred value is stored in the momentary storage unit 44 (see step S43 in FIG. 9). The inference control unit 46 compares the values d/2$^n$ to the required surface roughness, and repeats the above-mentioned steps S42 and S43 of FIG. 9 until d/2$^n$ becomes smaller than the required surface roughness. A plurality of peak current values IP α(1) to (n), are inferred and stored in the momentary storage unit 44 as the second, the third, so on, and the nth peak current. (See step S44 in FIG. 9).

Further, if values for the residue on side face and residue on bottom when machining is done with the obtained IP α(1)

to (n) do not exist, values for the residues on side face $\epsilon(1)$ to (n) and residues on bottom $z(1)$ to (n) corresponding to IP $\alpha(1)$ to (n) are inferred by using steps S45 through S49 of FIG. 9, and are stored in the momentary storage unit 44. It should be noted that when the basic data corresponding to the specification data (SD) does exist or when any basic data corresponding to IP $\alpha(1)$ to (n) does exist, that data is used.

FIG. 8 is a table showing the relationship regarding the study data and inference data used for inferring and compiling the peak current values up to the nth and the results. The table also shows the input layer and the input data used when the inference is done. The study and inference steps shown in FIG. 8 are done several times to compile the intermediate data which does not exist in the basic data storage unit 42.

The reduction in electrode dimension $\beta$, IP values $\alpha(1)$ to (n), residues on side face $\epsilon(1)$ to (n) and residues on bottom $\zeta(1)$ to (n) obtained as mentioned above are called out from the momentary storage unit 44 by the inference control unit 46, and sent to the main control unit 30. In the main control unit 30, the ON time ($T_{on}$) and the OFF time ($T_{off}$) suitable for the obtained IP values $\alpha(1)$ to (n) are calculated in a predetermined manner. In an embodiment of this invention, the current per IP value 1 is so determined that the IP set value multiplied by 30 to 40 may be the ON time (µsec), from which $T_{off}$ suited for obtained $T_{on}$ is selected, and the machining conditions from the first set of machining conditions at the start of machining to the nth (or final) set of machining conditions are determined. In place of the method of calculating the ON time ($T_{on}$) and the OFF time ($T_{off}$) corresponding to the IP value in the above-mentioned procedure, a structure can be used that calls out the electrical machining conditions parameters of ON time and OFF time corresponding to the IP $\alpha(1)$ to (n) by providing the storage unit, in which the relationship between the IP value, ON time, and OFF time are stored beforehand, in a storing media such as a ROM, in the main control unit 30. In this embodiment, the machining conditions stored in the basic data storing unit 42 are expressed by the peak current IP value. However, in addition to the use of the peak current value, the electrical machining conditions with which a surface roughness for final finish machining of 0.4 µRmax may be obtained from rough machining may be stored in the basic data storage unit 42 as basic data by expressing each machining condition as a value as, for instance, C1, C2, up to Cn and also preparing the results of the machining data obtained when machining is done with the machining conditions C1, C2, up to Cn as a plurality of sets of machining conditions which are a combination of the plural electrical machining conditions parameters such as for example, the ON time and OFF time corresponding to each IP value, the machining power supply voltage, the voltage of auxiliary power supply, etc.

Figure 7:
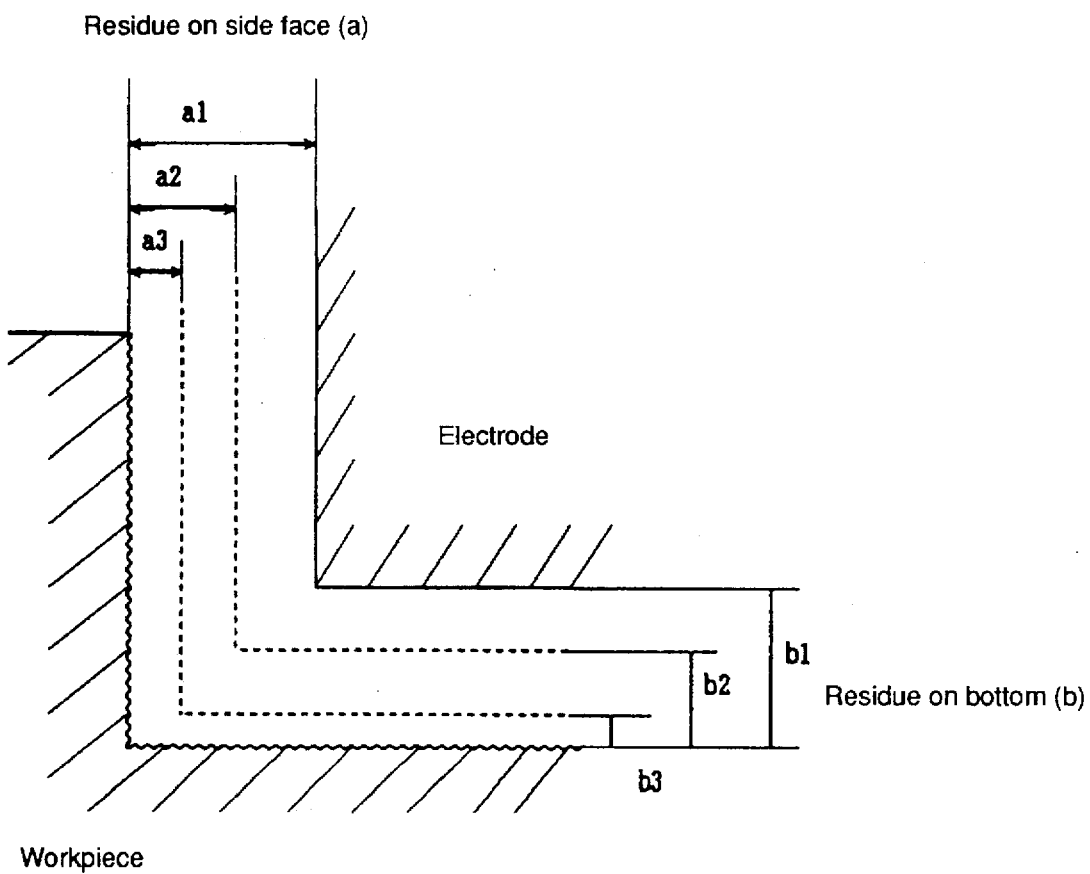
FIG. 7 shows an arrangement of the electrode and workpiece.

Next, in the main control unit 30, all necessary machining conditions, including the amplitude and the feed of the electrode at each machining stage, are calculated from the obtained values of $\alpha$, $\beta$, $\epsilon$ and $\zeta$. FIG. 7 is a drawing illustrating the relative positions of the electrode and the workpiece at various machining stages. The distance a1 is the distance necessary finish machining after machining is done using the first machining conditions. In other words, a1 represents the residue on the side face which is the sum of the over-cut and the allowance necessary for finish machining. The distance a2 is the residue on side face necessary for further finish machining when machining is done using the second machining conditions which are smaller than the first machining-conditions. The difference between a1 and a2, or $\beta-\epsilon(2)$, is the amplitude that the electrode moves relative to the workpiece in a plane which is perpendicular to the direction in which the electrode is fed. The distance a3 is an over-cut direction using finish machining conditions. Here, the side face residue is inferred using the side face values from FIG. 5. Since in FIG. 5, data for the side face residue for finish machining to the surface with a surface roughness of 0.4 µRmax is stored, in applications where a surface roughness rougher than 0.4 µRmax may be required, the desired machining conditions can be calculated with an understanding that the required dimension is larger by the value obtained by deducting the side gap from the side face residue $\epsilon(n)$ when machining is done to the desired machining dimensions using finish machining conditions, and by adding the amplitude to be obtained when machining is done with the subject machining conditions to the side gap, to arrive at the required dimension or position.

Next, consider the dimensions b1 which is the residue on bottom $\zeta(1)$ necessary for the final machining after machining is done with the first machining conditions. When machining is done using the first machining conditions, machining will be terminated at the value of b1 before the required machining depth. In other words, the first feed Z1 is the actual machining depth $Z-\zeta(1)$. Like the dimensions b1, b2 is a value which expresses the residue on the bottom face, this time denoted as $\zeta(2)$ which is the required finishing needed when machining is done using the second machining conditions. In other words, the machining depth for the second machining conditions is $Z2=Z-\zeta(2)$. The dimension b3 is the gap in the direction of the bottom face using finish machining conditions. Here, when the surface roughness is rougher than 0.4 µRmax, first the machining depth with each machining condition is calculated assuming that the surface is to be finished to 0.4 µRmax much like the finish in the side direction, and the feed in the depth direction is determined so that machining under specific machining conditions of surface roughness proceeds to the position of the appropriate machining depth.

The machining conditions data (SD) sent to the program compiling unit 50, where the machining program is compiled. Since the compiling method of this machining program is the same as the conventional art, a detailed description is omitted.

Next, the method of progressing the apparatus, which is the second object of this invention will be described. For each value of the IP $\alpha(1)$, reduction in electrode dimension $\beta$, side face residue $\epsilon$, etc. obtained as mentioned above is stored in the momentary storage unit 44, and when the results of the machining with the machining conditioning data (SD) are excellent, the operator issues an instruction to retain the machining conditions. The inferred data (FD) such as the data IP value, surface roughness, bottom gap, etc. used is also accumulated in the preliminary data storage unit, inside the basic data storage unit 42, as a part of the basic data along with the input values such as the machining area, machining depth, and the material(s). The inferred data is stored so as to be able to be used as one of the basic data at the inference stage when machining is done using a subsequent machining specification. In other words, when inferring, the data reader 41 first seeks the proximate value from the stored basic data, and then, the available data base itself, progress so that the inference may be done with better accuracy by adding more proximate data to the preliminary data storage unit, to be used as study data.

It should be noted that although this embodiment is a structure in which values are studied and inferred comes from the above-mentioned basic data, the first machining conditions obtained using this invention are more appropriate than those of available conventional apparatus, and the data regarding the results obtained by machining with the machining conditions are more accurate, with a smaller machining error, even though the second and subsequent machining conditions may be called out from preset machining conditions. Therefore, even when using machining conditions data (SP) at the start of machining and the fixed machining settings in which the second and subsequent machining conditions data are already stored in the prescribed manner, the machining accuracy can be considerably improved. Further, although in the described embodiment, only data such as the surface roughness, side gap, bottom gap, etc. are related to the IP value, other embodiments in which data such as the electrode wear rate, flushing conditions, etc. are stored in the basic data storage unit 42 as basic data from which to infer machining conditions, will be readily apparent to the artisan based upon this disclosure and can be easily appreciated.

By this invention, intermediate data suitable for machining requirements can be compiled from representative basic data for various different machining requirements, and the machining setting data can be determined with smaller errors and without requiring the collection and storage of a vast amount machining setting data, and machining can be done using machining setting data suitable for the machining requirements. Further, since the apparatus can progress so as to conduct studies and make inferences with better accuracy, using the successful results of prior inferences, improved machining efficiency and machining accuracy is possible.

The present invention is not limited to the identical form as disclosed, but many improvements and variations are possible in the light of the above-teachings and explanations. The above description was selected with the view of describing the essence of this invention and its practical application. The scope of the invention is to be defined by the attached claims.

What is claimed is:

1. An electrical discharge machining apparatus having an input device for inputting specification data including information regarding the electrode and workpiece materials and machining data and a setting data compiler for setting machining conditions and relative movement between the electrode and a workpiece in order to obtain a specified work product, said setting data compiler comprising:

a data storage unit for storing, as basic data, a plurality of sets of machining results and corresponding electrical discharge machining conditions;

a data reader for calling up from said data storage unit, as peripheral data, basic data close to or related to the machining data input from said input unit;

an inference unit for studying the peripheral data and for inferring machining conditions suited to said input machining data and relative movement between the electrode and the workpiece; and an inference control unit for controlling said inference unit.

2. The electrical discharge machine according to claim 1 further comprising a main control device, responsive to said input device, for generating setting data for said setting data compiler.

3. The electrical discharge machine according to claim 2 further comprising a program compiling device, responsive to said main control device for compiling a machining program for electric discharge machining in accordance with the specification data and information from said input device.

4. The electrical discharging machine according to claim 1 wherein the specification data includes area to be machined data, workpiece material data, electrode configuration data, machining depth data and desired surface roughness data.

5. The electrical discharge machine according to claim 1 wherein said data storage unit comprises a basic data storage unit for storing a plurality of sets of basic data indicative of the relationship between the specification data and corresponding machining conditions and a preliminary storage unit for storing data obtained from said inference unit as a result of an inference.

6. The electrical discharge machine according claim 5 further comprising a momentary storage unit, responsive to said inference control unit, for storing basic data from said data storage unit and additional data for use by said inference unit.

7. The device according to claim 1 wherein said inference unit comprises a neural network for studying the peripheral data and based thereon, for inferring machining conditions appropriate to the specification data.

8. The device according to claim 7 wherein the electrical discharge machining apparatus machines a cavity in said workpiece, said cavity having a side face and a bottom face and wherein the inferred machining conditions include one or more of peak machining current, side face residue, reserved electrode dimensions, electrode movement relative to the workpiece and vibration amplitude of the electrode.

9. A data processor implemented method of determining machining conditions and relative movement between an electrode and workpiece during electrical discharge machining based on input information and a plurality of sets of stored basic machining data stored in a memory of said data processor, said method comprising the steps of:

(a) inputting, into a memory associated with said data processor, specification data including information regarding the electrode and workpiece materials and machining requirements data;

(b) calling up from said memory the stored basic machining data, and peripheral data comprising a plurality of sets of basic data close to or related to said specification data;

(c) studying said peripheral data;

(d) inferring and compiling, based upon said step of studying, data regarding machining conditions and relative movement between the electrode and the workpiece suited to said specification data;

(e) electric discharge machining said workpiece using said machining condition and relative movement data from step (d).

10. The method according to claim 9, further comprising the steps of:

(f) adding inferred and compiled data to the basic data; and (g) repeating steps (a)–(d) using any data added during step (f) when repeating steps (b) to (d).

11. The method according to claim 10 further comprising the step of setting machining conditions for said electric discharge machining process to be effected based on the inferred and compiled data prior to step (e).

12. A data processor implemented method for electrical discharge machining, comprising:

(a) storing a plurality of sets of data files comprising electric discharge machining conditions;

(b) storing previously used machining data related to machining results obtained using inferred electrical discharge machining conditions;

(c) inputting specification data regarding an electric discharge machining process to be effected;

(d) calling up, in response to said input specification data, peripheral data comprising data from said stored data files and previously used machining data which are close to or related to the specification data;

(e) studying said peripheral data using a neural network;

(f) inferring and compiling, based on step (e), intermediate data related to the machining results to be obtained when machining is done using machining conditions suited to said specification data; and (g) electric discharge machining using the data from step (f).

13. The method according to claim 12 further comprising the step of setting machining conditions for said electric discharge machining process to be effected based on the inferred and compiled data prior to step (g).

* * * * *